(12) United States Patent
Hansen et al.

(10) Patent No.: US 7,521,487 B2
(45) Date of Patent: *Apr. 21, 2009

(54) PRESSURE-SENSITIVE ADHESIVE WITH DUAL CROSSLINKING MECHANISM

(75) Inventors: Sven Hansen, Hamburg (DE); Marc Husemann, Hamburg (DE); Kay Brandes, Moorkaten-Kaltenkirchen (DE); Stephan Zollner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 308 days.

This patent is subject to a terminal disclaimer.

(21) Appl. No.: 11/118,002

(22) Filed: Apr. 29, 2005

(65) Prior Publication Data

US 2006/0052472 A1 Mar. 9, 2006

(30) Foreign Application Priority Data

Sep. 9, 2004 (DE) ........................ 10 2004 044 085

(51) Int. Cl.
*C08F 2/50* (2006.01)
*B29C 35/02* (2006.01)
*B29C 35/08* (2006.01)
*C08J 3/28* (2006.01)

(52) U.S. Cl. .................... 522/178; 522/35; 522/904; 522/905; 522/104; 522/107; 522/120; 522/121; 522/123; 522/150; 522/153; 522/173; 522/182; 264/405; 264/494; 264/495

(58) Field of Classification Search ................ 522/35, 522/904, 905, 104, 107, 113, 114, 116, 120, 522/122, 123, 150, 153, 173, 174, 178, 182
See application file for complete search history.

(56) References Cited

U.S. PATENT DOCUMENTS

| | | | | |
|---|---|---|---|---|
| 4,199,646 A * | 4/1980 | Hori et al. ................ 428/344 |
| 4,581,429 A | 4/1986 | Solomon et al. .............. 526/220 |
| 4,619,979 A | 10/1986 | Kotnour et al. ............... 526/88 |
| 4,843,134 A | 6/1989 | Kotnour et al. ............. 526/318.4 |
| 5,047,443 A * | 9/1991 | Rehmer .................... 522/46 |
| 5,075,386 A * | 12/1991 | Vanderbilt ............... 525/327.3 |
| 5,416,127 A * | 5/1995 | Chandran et al. ........... 522/149 |
| 5,525,422 A | 6/1996 | Spies et al. ................ 428/355 |
| 5,536,759 A * | 7/1996 | Ramharack et al. .......... 522/35 |
| 5,608,023 A | 3/1997 | Odell et al. ................ 526/225 |
| 5,686,504 A * | 11/1997 | Ang .................... 522/46 |
| 5,767,210 A | 6/1998 | Lecomte et al. ............ 526/166 |
| 5,789,487 A | 8/1998 | Matyjaszewski et al. .... 525/301 |
| 5,811,500 A | 9/1998 | Dubois et al. .............. 526/145 |
| 5,854,364 A | 12/1998 | Senninger et al. .......... 526/192 |
| 5,877,261 A | 3/1999 | Harder et al. ............... 525/123 |
| 5,919,871 A | 7/1999 | Nicol et al. ............. 525/333.8 |
| 5,945,491 A | 8/1999 | Matyjaszewski et al. .... 526/111 |
| 6,114,482 A | 9/2000 | Senninger et al. .......... 526/172 |
| 6,281,311 B1 | 8/2001 | Lai et al. ................. 526/220 |
| 6,479,608 B1 | 11/2002 | Nesvadba et al. ......... 526/328.5 |
| 6,506,447 B1 | 1/2003 | Hirsch et al. ............ 427/208.4 |
| 6,720,399 B2 | 4/2004 | Husemann et al. |
| 6,753,079 B2 * | 6/2004 | Husemann et al. .... 428/355 AC |
| 6,831,114 B2 * | 12/2004 | Husemann et al. ............ 522/35 |
| 7,084,185 B2 * | 8/2006 | Husemann et al. .......... 522/149 |
| 2001/0012551 A1 | 8/2001 | Peloquin et al. |
| 2003/0088031 A1 * | 5/2003 | Husemann et al. ....... 525/329.7 |
| 2004/0006151 A1 | 1/2004 | Husemann et al. .......... 522/134 |
| 2004/0170119 A1 | 9/2004 | Watanabe .................... 369/286 |
| 2004/0171777 A1 | 9/2004 | Le et al. ...................... 526/286 |
| 2005/0020714 A1 | 1/2005 | Husemann et al. |
| 2005/0090592 A1 | 4/2005 | Husemann et al. .......... 524/322 |
| 2005/0129936 A1 | 6/2005 | Husemann et al. |

FOREIGN PATENT DOCUMENTS

| | | |
|---|---|---|
| DE | 195 24 250 | 1/1997 |
| DE | 199 49 352 | 4/2000 |
| DE | 199 39 073 | 2/2001 |
| DE | 100 36 802 | 2/2002 |
| DE | 100 36 803 | 2/2002 |
| DE | 102 59 460 | 7/2004 |
| EP | 0 588 180 A1 | 3/1994 |
| EP | 0 735 052 | 10/1996 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1 300 427 | 4/2003 |

(Continued)

OTHER PUBLICATIONS

Handbook of Pressure Sensitive Adhesive Technology by Donatas Satas (van Nostrand, New York 1989, pp. 444-514).
Fouassier: "Photoinititation, Photopolymerization and Photocuring: Fundamentals and Applications", Hanser-Verlag, Munich 1995.
Carroy et al. "Chemistry and Technology of UV and EB Formulation for Coatings, Inks and Paints", Oldring (Ed.), 1994, SITA, London.
T.G. Fox, Bull. Am. Phys. Soc. 1 (1956) 123.
Houben Weyl, Methoden der Organischen Chemie, vol. E 19a, pp. 60-147.
Macromolecules, 1995, 28, 7886.
Handbook of Pressure Sensitive Adhesive Technology by Donatas Satas (van Nostrand, New York, 1989, pp. 896 ff and 515-541.
Polymer Aug. 1967, pp. 381-384.

*Primary Examiner*—Sanza L McClendon
(74) *Attorney, Agent, or Firm*—Norris McLaughlin & Marcus PA

(57) ABSTRACT

A process for preparing a polyacrylate-based shaped article, a polyacrylate being polymerized by a conventional method, wherein the polyacrylate comprises copolymerized comonomers having thermally crosslinkable groups and comonomers having attached photoinitiators, and the polyacrylate is crosslinked thermally in a first step and by irradiation with UV light in a second step.

10 Claims, No Drawings

FOREIGN PATENT DOCUMENTS

| | | |
|---|---|---|
| JP | 2001316658 A | 11/2001 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 03/046030 | 6/2003 |
| WO | WO 2005/059052 | 6/2005 |

* cited by examiner

PRESSURE-SENSITIVE ADHESIVE WITH DUAL CROSSLINKING MECHANISM

BACKGROUND OF THE INVENTION

The invention relates to a process for producing pressure-sensitive adhesive tapes, an acrylate hotmelt pressure-sensitive adhesive being coated from the melt onto a backing and subsequently crosslinked.

In the field of pressure-sensitive adhesive (PSA) compositions, ongoing technological developments in the coating process mean that there is a continual need for new developments. Within the industry, hotmelt processes with solventless coating technology are of increasing importance for the preparation of PSAs, since the environmental strictures are becoming ever greater and the prices of solvents continue to rise. The consequence of this is that solvents are to be eliminated as far as possible from the manufacturing process for PSA tapes. The associated introduction of hotmelt technology is imposing ever greater requirements on the adhesives. Acrylate PSAs in particular are the subject of very intensive investigations aimed at improvements. For high-level industrial applications, polyacrylates are preferred on account of their transparency and weathering stability. As well as these advantages, however, these acrylate PSAs must also meet exacting requirements in respect of shear strength and bond strength. This profile of requirements is achieved by polyacrylates of high molecular weight and high polarity, with subsequent efficient crosslinking. These polar PSAs of high shear strength, however, possess the disadvantage that they are not very suitable for the hotmelt extrusion process, since the high flow viscosity necessitates high application temperatures and, moreover, the molecular weight of the polymer is reduced as a result of shearing within the extruder. Such damage significantly lowers the technical adhesive level. The bond strength and the tack are generally low, since owing to the polar fractions in the adhesives the glass transition temperature is relatively high. There is a marked fall in particular in the shear strengths of hotmelt-coated acrylate PSAs, in comparison to the original solvent-coated PSA. At the present time, therefore, various concepts are being investigated with the aim of reducing the flow viscosity and hence facilitating the extrusion coating of these PSAs.

One very important concept is the targeted adjustment of the molecular weight distribution for the purpose of improved processing properties. Bimodal molecular weight distributions assist easier processing, since low molecular weight fractions lower the flow viscosity while high molecular weight fractions increase the shear strength. Bimodal molecular weight distributions are generally produced by means of targeted blending.

U.S. Pat. Nos. 4,619,979 and 4,843,134 describe a preparation process for the solventless polymerization of acrylates. There, in a particular polymerization reactor, highly branched polymers were prepared. These polymers likewise generally possess a reduced flow viscosity as compared with their linear counterparts.

A further disadvantage of existing acrylate hotmelt PSAs, moreover, is the limited crosslinking mechanism: in comparison to existing solvent systems, these PSAs cannot generally be crosslinked thermally, since otherwise they would gel during processing prior to coating.

SUMMARY OF THE INVENTION

It is an object of the present invention to avoid the disadvantages which exist in the prior art and to provide, for a shaped polyacrylate article, in particular for acrylate PSAs, a crosslinking system which allows processing from the melt and through which, by virtue of an efficient crosslinking mechanism, a PSA having high shear strength can be obtained.

This object is achieved, surprisingly and in a way which was unforeseeable for the skilled worker, by means of a process as specified in the main claim: that is, with specially modified polyacrylates, which can be processed and shaped—in particular, can be coated—from the melt and which after the shaping operation—in particular, the coating operation—are crosslinked first thermally and then by UV.

The dependent claims relate to advantageous embodiments of the process of the invention.

DETAILED DESCRIPTION

The invention accordingly provides a process for producing polyacrylate-based shaped articles, especially two-dimensionally flat shaped articles, and particularly polyacrylate pressure-sensitive adhesive layers, wherein a polyacrylate, in particular a polyacrylate pressure-sensitive adhesive, is polymerized by a conventional method, and wherein, further, the polyacrylate comprises copolymerized comonomers having thermally crosslinkable groups and comonomers with attached photoinitiators, and the polyacrylate is crosslinked thermally in a first step and by irradiation of UV light in a second step.

In particular the polyacrylate, after the polymerization, is coated onto a permanent or temporary backing, with the crosslinking steps taking place after coating, and in particular on the backing.

PSAs Employable in Accordance with the Invention

For the purposes of the invention the PSAs used are preferably (meth)acrylate PSAs, i.e., PSAs based on polyacrylate and/or polymethacrylate, thus having a substantial or predominant fraction of polyacrylates and/or polymethacrylates and/or derivatives of the above compounds.

Further comonomers used for preparing the PSAs, for the purposes of the invention, are monomers having thermally crosslinkable groups and also monomers having copolymerized photoinitiators.

The monomers are preferably chosen such that the resulting polymers can be used as PSAs at room temperature or higher temperatures, and particularly such that the resulting polymers possess pressure-sensitive adhesion properties in accordance with the "Handbook of Pressure Sensitive Adhesive Technology" by Donatas Satas (van Nostrand, New York 1989, pages 444-514).

The polymers are obtainable preferably by polymerizing a monomer mixture possessing a high or predominant fraction of acrylic esters and/or methacrylic esters and/or the associated free acids with the formula $CH_2=C(R_1)(COOR_2)$, wherein $R_1=H$ or $CH_3$ and $R_2$ is an alkyl chain having 1-20 carbon atoms or H.

The weight-average molecular weight $M_w$ of the polyacrylates used is preferably $M_w<500\,000$ g/mol, very preferably $M_w<350\,000$ g/mol.

In one very preferred way, use is made of acrylic or methacrylic monomers which are composed of acrylic and methacrylic esters having alkyl groups made up of 1 to 14 carbon atoms, preferably 1 to 9 carbon atoms. Specific examples, without wishing to be restricted by this enumeration, are methyl acrylate, methyl methacrylate, ethyl acrylate, nbutyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as isobutyl acrylate, 2-ethylhexyl acrylate, 2-ethylhexyl methacrylate, isooctyl acrylate and isooctyl methacrylate, for example.

Further classes of compounds to be employed are monofunctional acrylates and/or methacrylates of bridged cycloalkyl alcohols, composed of at least 6 carbon atoms. The cycloalkyl alcohols may also be substituted, by C-1-6 alkyl groups, halogen atoms or cyano groups, for example. Specific examples are cyclohexyl methacrylates, isobornyl acrylate, isobornyl methacrylates and 3,5-dimethyladamantyl acrylate.

Monomers additionally suitable are, for example, N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl) methacrylamide, N-methylolacrylamide, N-(ethoxymethyl) acrylamide, and N-isopropylacrylamide, for example, this enumeration not being exhaustive.

A further constituent of the (meth)acrylate PSAs used for the purposes of this invention are comonomers having crosslinkable groups, such as carboxyl radicals, sulfonic and phosphonic acid, hydroxy radicals, lactam and lactone, N-substituted amide, N-substituted amine, carbamate, epoxy, thiol, alkoxy and cyano radicals, ethers or the like, for example.

Preferred monomers for this purpose are hydroxyethyl acrylate, hydroxypropyl acrylate, hydroxyethyl methacrylate, hydroxypropyl methacrylate, allyl alcohol, maleic anhydride, itaconic anhydride, itaconic acid, glyceridyl methacrylate, 4-hydroxybutyl acrylate, 6-hydroxyhexyl methacrylate, vinylacetic acid, β-acryloyloxypropionic acid, trichloroacrylic acid, fumaric acid, crotonic acid, aconitic acid, dimethylacrylic acid, and acrylic acid, this enumeration not being exhaustive.

A further constituent of the (meth)acrylate PSAs described in the context of the invention are comonomers having attached photoinitiators. Suitable photoinitiators are Norrish I and II photoinitiators. Examples are benzoin acrylate and an acrylated benzophenone from UCB (Ebecryl P 36®), for example. In principle it is possible to copolymerize all photoinitiators known to the skilled worker that are able to crosslink the polymer via a free-radical mechanism under UV irradiation. An overview of possible photoinitiators which can be used, and which can be functionalized with a double bond, is given in Fouassier: "Photoinititation, Photopolymerization and Photocuring: Fundamentals and Applications", Hanser-Verlag, Munich 1995. This is supplemented using Carroy et al. in "Chemistry and Technology of UV and EB Formulation for Coatings, Inks and Paints", Oldring (Ed.), 1994, SITA, London.

For crosslinking of UV light it is also possible for the polyacrylate PSAs to be admixed additionally with UV-absorbing photoinitiators. Useful photoinitiators whose use is very effective are benzoin ethers, such as benzoin methyl ether and benzoin isopropyl ether, substituted acetophenones, such as 2,2-diethoxyacetophenone (available as Irgacure 651® from Ciba Geigy), 2,2-dimethoxy-2-phenyl-1-phenylethanone, dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl) oxime, for example.

The abovementioned photoinitiators and others which can be used, and others of the Norrish I or Norrish II type, may include the following radicals: benzophenone-, acetophenone-, benzil-, benzoin-, hydroxyalkylphenone-, phenyl cyclohexyl ketone-, anthraquinone-, trimethylbenzoylphosphine oxide-, methylthiophenyl morpholine ketone-, amino ketone-, azobenzoin-, thioxanthone-, hexaarylbisimidazole-, triazine-, or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", HanserVerlag, Munich 1995. To supplement this it is possible to consult Carroy et al. in "Chemistry and Technology of UV and EB Formulation for Coatings, Inks and Paints", Oldring (Ed.), 1994, SITA, London.

To increase the efficiency of the UV postcrosslinking it is also possible to add polyfunctional acrylates to the polyacrylate. Preferred substances crosslinking under radiation in accordance with the inventive process are, for example, di-, tri- or tetrafunctional acrylates or di- or polyfunctional urethane acrylates. Use may also be made here, however, of all further difunctional or polyfunctional compounds familiar to the skilled worker that are capable of crosslinking polyacrylates by radiation-chemical means.

For the purpose of further development it is possible to admix resins with the PSAs. Tackifying resins for addition that can be used include, without exception, all known tackifier resins and all tackifier resins described in the literature. Representatives that may be mentioned are the pinene resins, indene resins, and rosins, their disproportionated, hydrogenated, polymerized and/or esterified derivatives and salts, the aliphatic and aromatic hydrocarbon resins, terpene resins and terpene-phenolic resins, and also C5, C9 and other hydrocarbon resins. Any desired combinations of these and further resins may be used in order to adjust the properties of the resultant adhesive in accordance with what is desired. In general it is possible to use all resins that are compatible with (soluble in) the corresponding poly(meth)acrylate; in particular, reference may be made to all aliphatic, aromatic and alkylaromatic hydrocarbon resins, hydrocarbon resins based on single monomers, hydrogenated hydrocarbon resins, functional hydrocarbon resins, and natural resins. Particularly preferred tackifier resins are those having a high UV transmission in the wavelength range relevant for the irradiation. When using copolymerized benzoin acrylate as a photoinitiator, hydrogenated rosin esters have proven particularly advantageous, such as Foral 85 and Foral 110 (both from Eastman Chemical). Express reference may be made to the depiction of the state of the art in the "Handbook of Pressure Sensitive Adhesive Technology" by Donatas Satas (van Nostrand, 1989, pages 609-631 and 515-549).

In addition it is possible optionally to add plasticizers, further fillers (such as fibers, zinc oxide, chalk, solid or hollow glass beads, microbeads made of other materials, silica, silicates), nucleators, expandants, compounding agents and/ or aging inhibitors, in the form, for example, of primary and secondary antioxidants or in the form of light stabilizers, in concentrations which allow UV postcrosslinking.

A further constituent of the invention is the crosslinking mechanism after hotmelt coating. In a first step the PSA is crosslinked thermally. Suitable crosslinkers are therefore compounded into the adhesive. Here, in one preferred version, crosslinkers are used which enter into a chemical reaction with the functional comonomers of the (meth)acrylate PSA. Examples of suitable crosslinkers include difunctional or polyfunctional isocyanates (including those in blocked form), difunctional or polyfunctional epoxides, difunctional or polyfunctional hydroxides or difunctional or polyfunctional amines or amides, for example. One important criterion is the time between the metered addition of the crosslinking system and the visually homogeneous shaping onto a backing, which is referred to as the processing time. The processing time is heavily dependent on operating temperature, type and amount of crosslinker, and on the functionalization of the acrylate composition with, for example, carboxyl and/or hydroxyl groups, and it indicates the period of time within which the adhesive blended with crosslinker can be coated with a visually good coat appearance (gel-free, speck-free). The processing time is dependent to a particularly large extent on the weight-average molecular weight, which is why polyacrylates with an Mw<500 000 are preferred according to the invention.

The addition and incorporation of the thermally reactive crosslinking system into the solvent-free polyacrylate matrix to be crosslinked takes place preferably in continuous compounding equipment. This equipment is designed in accordance with the invention such that, with thorough mixing and simultaneously low introduction of shearing energy, a short residence time of the composition is ensured after the crosslinking system has been metered. The compounding equipment preferably comprises twin-screw extruders and/or planetary roll extruders. It is particularly advantageous in this case if the spindles of the extruder are heatable and/or coolable.

The crosslinkers are added at one or more points in the equipment, preferably in unpressurized zones. It is also advantageous if the thermally reactive crosslinker substances are added in finely divided form to the polyacrylate; for example, as an aerosol, in fine droplets, or in dilution in a suitable diluent such as a polymer-compatible plasticizer. After the thermal crosslinker has been homogenized the composition is conveyed to a coating unit and transferred to a backing, preferably by means of 2-roll coating or nozzle coating. The time from the metered addition of the crosslinking system in the compounding equipment to the point of shaping onto a backing is referred to as the processing time. Within this time, the pressure-sensitive adhesive which is undergoing crosslinking can be coated gel-free and with a visually good coated appearance. Thermal crosslinking then takes place primarily after coating on the web, and can be accelerated by introducing heat. Downstream IR lamps are suitable for this purpose. In the case of particularly reactive crosslinking systems, however, this is not necessary. Thus polyacrylates incorporating primary hydroxyl groups as crosslinking groups react even at room temperature with aliphatic and aromatic isocyanates, the use of trimerized isocyanates being particularly preferred.

A further constituent of the invention is the subsequent crosslinking with actinic radiation, especially UV irradiation. In this case the shaped and thermally precrossed layer is postcrosslinked by UV irradiation. This produces pressure-sensitive adhesives having a particularly high shear strength and a long processing time (gel-free time).

Production Processes for the Pressure-Sensitive Adhesive Tapes

For the polymerization the monomers are chosen such that the resulting polymers can be used at room temperature or higher temperatures as PSAs, and particularly such that the resulting polymers possess pressure-sensitive adhesion properties in accordance with the "Handbook of Pressure Sensitive Adhesive Technology" by Donatas Satas (van Nostrand, New York 1989, pages 444-514).

In order to obtain a preferred polymer glass transition temperature $T_g$ of $T_g<25°$ C., and in accordance with what has been said above, the monomers are very preferably selected, and the quantitative composition of the monomer mixture advantageously chosen, such that in accordance with the Fox equation (E1) (cf. T. G. Fox, Bull. Am. Phys. Soc. 1 (1956) 123) the desired $T_g$ value for the polymer is obtained.

$$\frac{1}{T_g} = \sum_n \frac{w_n}{T_{g,n}} \tag{E1}$$

In this formula, n represents the serial number of the monomers used, $w_n$ the mass fraction of the respective monomer n (% by weight), and $T_{g,n}$ the respective glass transition temperature of the homopolymer of each of the monomers n, in K.

The polymerization of the PSA takes place in accordance with polymerization processes that are known per se. To prepare the poly(meth)acrylate PSAs it is advantageous to carry out conventional free-radical addition polymerizations. For the polymerizations which proceed by a free-radical mechanism it is preferred to use initiator systems which additionally include further free-radical initiators for the polymerization, especially thermally decomposing radical-forming azo or peroxo initiators. In principle, however, all customary initiators familiar to the skilled worker for acrylates are suitable. The production of C-centered radicals is described in Houben Weyl, Methoden der Organischen Chemie, Vol. E 19a, pp. 60-147. These methods are preferentially employed analogously. Examples of free-radical sources are peroxides, hydroperoxides and azo compounds; a number of nonexclusive examples that may be mentioned here of typical free-radical initiators include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate and benzpinacole. In one very preferred version the free-radical initiator used is 1,1'-azobis(cyclohexanecarbonitrile) (Vazo 88™ from DuPont) or azodiisobutyronitrile (AIBN).

The weight-average molecular weights $M_w$ of the PSAs formed in the free-radical polymerization are very preferably chosen such that they are situated within a range of $M_w<500$ 000 g/mol. It may be necessary to carry out the polymerization in the presence of polymerization regulators such as thiols, halogen compounds and, in particular, alcohols (isopropanol), in order to set the desired weight-average molecular weight $M_w$. The average molecular weight is determined by size exclusion chromatography (GPC) or matrixassisted laser desorption/ionization coupled with mass spectrometry (MALDI-MS).

The polymerization can be carried out in bulk (without solvent), in the presence of one or more organic solvents, in the presence of water, or in mixtures of organic solvents and water. The aim here is to minimize the amount of solvent used. Suitable organic solvents are simple alkanes (e.g., hexane, heptane, octane, isooctane), aromatic hydrocarbons (e.g., benzene, toluene, xylene), esters (e.g., ethyl acetate, propyl acetate, butyl acetate or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. A water-miscible or hydrophilic cosolvent may be added to the aqueous polymerization reactions in order to ensure that the reaction mixture during monomer conversion is in the form of a homogeneous phase. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones and the like, and also derivatives and mixtures thereof.

The polymerization time amounts to between 2 and 72 hours, depending on conversion and temperature. The higher the reaction temperature that can be chosen, in other words the higher the thermal stability of the reaction mixture, the lower the level at which the reaction time can be chosen.

To initiate the polymerization, the introduction of heat is essential for the thermally decomposing initiators. For the thermally decomposing initiators the polymerization can be initiated by heating at 50 to 160° C., depending on initiator type.

For the preparation it may also be of advantage to polymerize the acrylate PSAs in bulk (without solvent). Particularly suitable in this case is the prepolymerization technique. The polymerization is initiated with UV light but taken only to a low conversion of about 10%-30%. Subsequently this polymer syrup can be welded, for example, into film (in the simplest case, ice cubes) and then polymerized through in water to a high conversion. The resulting pellets can then be used as acrylate hotmelt adhesives, particular preference being given to the use, for the melting operation, of film materials which are compatible with the polyacrylate.

Another advantageous preparation process for the poly(meth)acrylate PSAs is that of anionic polymerization. In this case the reaction medium used preferably comprises inert solvents, such as aliphatic and cycloaliphatic hydrocarbons, or else aromatic hydrocarbons, for example.

The living polymer is in this case generally represented with a structure $P_L(A)$-Me, wherein Me is a metal from group I, such as lithium, sodium or potassium, for example, and $P_L(A)$ is a growing polymer block of the monomers A. The molar mass of the polymer under preparation is controlled by the ratio of initiator concentration to monomer concentration. Examples of suitable polymerization initiators include n-propyllithium, nbutyllithium, sec-butyllithium, 2-naphthyllithium, cyclohexyllithium and octyllithium, this enumeration making no claim to completeness. Also known for the polymerization of acrylates are initiators based on samarium complexes (Macromolecules, 1995, 28, 7886), and they can be used here.

Moreover, it is also possible to use difunctional initiators, such as 1,1,4,4-tetraphenyl-1,4-dilithiobutane or 1,1,4,4-tetraphenyl-1,4-dilithioisobutane, for example. Coinitiators may likewise be used. Suitable coinitiators include lithium halides, alkali metal alkoxides or alkylaluminum compounds. In one very preferred version the ligands and coinitiators are chosen such that acrylic monomers, such as n-butyl acrylate and 2-ethylhexyl acrylate, for example, can be polymerized directly and need not be generated in the polymer by a transesterification with the corresponding alcohol.

Also particularly suitable for the process of the invention are polyacrylates having a narrow molecular weight distribution (polydispersity <4). These masses enjoy particular sheer strength after crosslinking for a relatively low molecular weight. Since a narrowdistribution polyacrylate requires a lower molecular weight for a given level of cohesion than one with normal distribution, viscosity and operating temperatures are reduced. Hence a narrow-distribution polyacrylate allows an especially long processing time.

In order to prepare polyacrylate PSAs having a narrow molecular weight distribution, controlled radical polymerization methods are also suitable. For the polymerization it is then preferred to use a control reagent of the general formula:

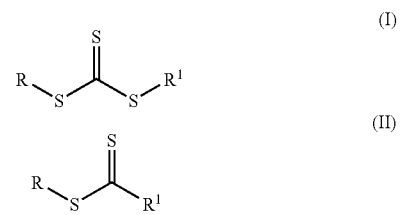

in which R and $R^1$, chosen independently of one another or identical, are branched and unbranched $C_1$ to $C_{18}$ alkyl radicals; $C_3$ to $C_{18}$ alkenyl radicals; $C_3$ to $C_{18}$ alkynyl radicals;

$C_1$ to $C_{18}$ alkoxy radicals;

$C_3$ to $C_{18}$ alkynyl radicals; $C_3$ to $C_{18}$ alkenyl radicals; $C_1$ to $C_{18}$ alkyl radicals substituted by at least one OH group or a halogen atom or a silyl ether;

$C_2$ to $C_{18}$ heteroalkyl radicals having at least one oxygen atom and/or one NR* group in the carbon chain, R* representing any (especially organic) radical;

$C_3$ to $C_{18}$ alkynyl radicals, $C_3$ to $C_{18}$ alkenyl radicals, $C_1$ to $C_{18}$ alkyl radicals substituted by at least one ester group, amine group, carbonate group, cyano group, isocyano group and/or epoxide group and/or by sulfur, $C_3$ to $C_{12}$ cycloalkyl radicals;

$C_6$ to $C_{18}$ aryl or benzyl radicals;

hydrogen.

Control reagents of type (I) are preferably composed of further-restricted compounds as follows:

Halogen atoms therein are preferably F, Cl, Br or I, more preferably Cl and Br. As alkyl, alkenyl, and alkynyl radicals in the various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl.

Examples of alkenyl radicals having from 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl and oleyl.

Examples of alkynyl having from 3 to 18 carbon atoms are propynyl, 2-butynyl, 3-butynyl, n-2-octynyl and n-2-octadecynyl.

Examples of hydroxy-substituted alkyl radicals are hydroxypropyl, hydroxybutyl and hydroxyhexyl.

Examples of halogen-substituted alkyl radicals are dichlorobutyl, monobromobutyl and trichlorohexyl.

A suitable $C_2$-$C_{18}$ heteroalkyl radical having at least one oxygen atom in the carbon chain is, for example, —$CH_2$—$CH_2$—O—$CH_2$—$CH_3$.

Examples of $C_3$-$C_{12}$ cycloalkyl radicals include cyclopropyl, cyclopentyl, cyclohexyl and trimethylcyclohexyl.

Examples of $C_6$-$C_{18}$ aryl radicals include phenyl, naphthyl, benzyl, 4-tert-butylbenzyl or further substituted phenyl, such as ethylbenzene, toluene, xylene, mesitylene, isopropylbenzene, dichlorobenzene or bromotoluene.

The above listings serve only as examples of the respective groups of compounds, and make no claim to completeness.

Moreover, compounds of the following types may also be used as control reagents

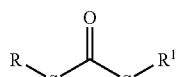

(III)

(IV)

where likewise $R^2$ may be chosen independently of R and $R^1$ but from the above-recited group for these radicals.

In the case of the conventional "RAFT" process, polymerization is normally carried out only to low conversions (WO 98/01478 A1) in order to obtain very narrow molecular weight distributions. As a result of the low conversions, however, these polymers cannot be used as PSAs and in particular not as hotmelt PSAs, since the high fraction of residual monomers adversely affects the technical adhesive properties; the residual monomers would contaminate the solvent recyclate in the concentration process and the corresponding self-adhesive tapes would exhibit very high outgassing behavior. In order to circumvent this drawback of low conversions, in one particularly preferred procedure the polymerization is initiated a number of times.

As a further controlled radical polymerization method it is possible to carry out nitroxidecontrolled polymerizations. In an advantageous procedure, radical stabilization is effected using nitroxides of type (Va) or (Vb):

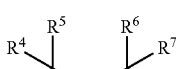

(Va)

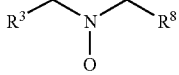

(Vb)

where $R^3$, $R^4$, $R^5$, $R^6$, $R^7$, $R^8$, $R^9$, and $R^{10}$ independently of one another denote the following compounds or atoms:

i) halides, such as chlorine, bromine or iodine, ii) linear, branched, cyclic, and heterocyclic hydrocarbons having from 1 to 20 carbon atoms, which may be saturated, unsaturated or aromatic, iii) esters —$COOR^{11}$, alkoxides —$OR^{12}$ and/or phosphonates —$PO(OR^{13})_2$, where $R^{11}$, $R^{12}$, and $R^{13}$ stand for radicals from group ii).

Compounds of structure (Va) or (Vb) may also be attached to polymer chains of any kind (primarily in the sense that at least one of the abovementioned radicals constitutes a polymer chain of this kind) and may therefore be used to construct the polyacrylate PSAs.

With more preference, controlled regulators chosen from the following compounds are used for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethylPROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxyTEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

A range of further polymerization methods in accordance with which the PSAs may alternatively be prepared can be chosen from the prior art:

U.S. Pat. No. 4,581,429 A discloses a controlled-growth radical polymerization process which uses as its initiator a compound of the formula R'R"N—O—Y, in which Y denotes a free radical species which is able to polymerize unsaturated monomers. In general, however, the reactions have low conversion rates. A particular problem is the polymerization of acrylates, which takes place only with very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, for example, are used. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides improve the efficiency for the preparation of polyacrylates (Hawker, contribution to the National Meeting of The American Chemical Society, Spring 1997; Husemann, contribution to the IUPAC World Polymer Meeting 1998, Gold Coast).

As a further controlled polymerization method, atom transfer radical polymerization (ATRP) can be used advantageously to synthesize the polyacrylate PSAs, in which case use is made preferably as initiator of monofunctional or difunctional secondary or tertiary halides and, for abstracting the halide(s), of complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. Nos. 5,945, 491 A, 5,854,364 A, and 5,789,487 A.

Coating Processes, Application of the Pressure-Sensitive Adhesive to the Backing Material In order to produce the PSA tapes, the hotmelt PSAs described above are preferably coated as hotmelt systems (i.e., from the melt). For the production process it may therefore be necessary in a first step to remove the solvent from the PSA. In principle it is possible here to use any of the techniques known to the skilled worker. One very preferred technique is that of concentration using a single-screw or twin-screw extruder. The twinscrew extruder may be operated corotatingly or counterrotatingly. The solvent or water is distilled off preferably by way of several vacuum stages. Moreover, counterheating is carried out depending on the distillation temperature of the solvent. The residual solvent fractions are preferably <1%, more preferably <0.5% and very preferably <0.2%. The hotmelt is processed further from the melt.

For coating as a hotmelt it is possible to employ a variety of coating techniques. In one embodiment the hotmelt PSAs are coated by a roll coating process. Various roll coating techniques are described in the "Handbook of Pressure Sensitive Adhesive Technology" by Donatas Satas (van Nostrand, New York, 1989, pp. 896 ff and 515-541). In another version coating takes place through a melt die. A distinction can be made here between the contact process and the noncontact process. The melt film is produced within the coating die, by virtue of the die design. Following emergence from the die, by a drawing process, the polymer chains can be oriented. The draw ratio can be controlled, for example, by the width of the die gap. Drawing occurs whenever the layer thickness of the PSA film on the backing material to be coated is less than the width of the die gap.

In another preferred process, coating takes place through an extrusion die. Extrusion coating is preferably performed using an extrusion die. The extrusion dies used may originate with advantage from one of the three following categories: T-dies, fishtail dies, and coathanger dies. The individual types differ in the design of their flow channel. Through the form of the extrusion die it is likewise possible to produce an orientation within the hotmelt PSA. Additionally, here, in analogy to melt die coating, it is likewise possible to obtain an orientation following emergence from the die, by drawing the PSA tape film.

The (meth)acrylate hotmelt adhesives are coated onto a suitable backing material, in order by this means to produce a single-sided or double-sided PSA tape.

In one version, transfer tapes are produced. Examples of suitable backing materials include all siliconized or fluorinated films having a release action. Merely by way of example here, mention may be made, as film materials, of BOPP, MOPP, PET, PEN, polyimide, PVC, PU, PE, PE/EVA, EPDM, PP and PE. Additionally, for transfer tapes, it is also possible to use release papers (glassine papers, kraft papers, polyolefin-coated papers).

Where the backing material remains in the PSA (in the form of a backing film, for example) it is preferred to use a backing film or a backing web (nonwoven backing).

It is possible, for example, to use films which comprise boron nitride, aluminum oxide or silicon nitride. An alternative possibility is to use metal foils. Particularly preferred foils consist of aluminum, copper, stainless steel, metal alloys, etc. Film materials which can be used further include BOPP, MOPP, PET, PEN, polyimide, PVC, PU, PE, PE/EVA, EPDM, PP and PE. As backing materials, however, it is also possible, additionally, to use nonwovens (PP, PET) or paper nonwovens or other woven-fabric materials.

After the coating operation, the PSAs are first crosslinked thermally. For this purpose it is possible to introduce heat, by means, for example, of infrared lamps, a heating tunnel or a tubular tunnel, in order to increase the residence time. Additionally, where appropriate, the material in bale form can be afterconditioned in a drying chamber. In one preferred version the PSA tape is heated to at least 60° C., more preferably to 80° C., and very preferably to more than 100° C. A further factor determining the degree of crosslinking is the period of residence in the temperature range. In one preferred embodiment the conditioning time ought to be at least 15 s, more preferably 30 s, and very preferably more than 1 minute. If no thermal conditioning is to take place, the material in bale form may also be stored at room temperature for 2-10 days, depending on the proportion and reactivity of the thermal crosslinker.

For implementing the dual crosslinking mechanism, the PSA is subsequently crosslinked with UV light.

For UV crosslinking irradiation takes place by means of shortwave ultraviolet radiation in a wavelength range from 200 to 400 nm, depending on the UV photoinitiator used, and using, in particular, high-pressure or medium-pressure mercury lamps, with an output of 80 to 240 W/cm. The irradiation intensity is adapted to the particular quantum yield of the UV photoinitiator, the degree of crosslinking to be set, and the extent of orientation. Furthermore, for a given lamp output, it is possible to vary the number of UV lamps and to vary the operating speed.

EXAMPLES

The invention is illustrated below by means of examples and experiments.

For investigation of the samples the following test methods were employed:

Test Methods:

Solids Content (Test A):

The solids content is a measure of the unevaporable fraction in a polymer solution. It is determined gravimetrically by weighing the solution, then evaporating off the evaporable fractions in a drying cabinet at 120° C. for 2 hours, and back-weighing the residue.

K Value (According to Fikentscher) (Test B).

The K value is a measure of the average molecular size of high polymers. For the measurement, one percent strength (1 g/100 ml) solutions of polymer in toluene were prepared and their kinematic viscosities were determined by means of a Vogel-Ossag viscometer. Standardization to the viscosity of the toluene gives the relative viscosity, from which the K value can be calculated according to Fikentscher (Polymer 8/1967, 381 ff.)

Gel Permeation Chromatography GPC (Test C):

The average molecular weight MW and the polydispersity PD were determined by the company Polymer Standards Service, Mainz, Germany. The eluant used was THF containing 0.1% by volume trifluoroacetic acid. Measurement took place at 25° C. The precolumn used was PSS-SDV, 5µ, $10^3$ Å, ID 8.0 mm×50 mm. Separation was carried out using the columns PSS-SDV, 5µ, $10^3$ and also $10^5$ and $10^6$, each of ID 8.0 mm×300 mm. The sample concentration was 4 g/l, the flow rate 1.0 ml per minute. Measurement was made against PMMA standards.

Dynamic Flow Viscosity (Test D)

The measurements were carried out using the dynamic stress rheometer instrument from Rheometrics. For sample preparation the liquid polymers were applied to a siliconized release paper backing and dried in a drying cabinet at 120° C. for 10 minutes. The application rate was 100 g/ml. Then strips were cut and laminated one on top of another until the assembly has a thickness of approximately 1 mm. Circular specimens with a diameter of 25 mm were cut from these laminates, and the Theological measurements were carried out using these laminates. At 100° C. the frequency was varied from 0.1 to 100 rad/s. For the purpose of comparison the flow viscosities measured in each case at 10 rad/s are reported. Measurement was carried out with a parallel plate arrangement.

Determination of the Gel Fraction (Test E)

The carefully dried solvent-free samples of adhesive are welded into a pouch of nonwoven polyethylene (Tyvek web). The difference in the sample weights before and after extraction with toluene determines the gel value.

180° Bond Strength Test (Test F)

A strip 20 mm wide of an acrylate PSA applied as a layer to polyester was itself applied to steel plates. The PSA strip was pressed onto the substrate twice using a 2 kg weight. Immediately thereafter the adhesive tape was peeled from the substrate at 300 mm/min and at an angle of 180°. The steel plates were washed twice with acetone and once with isopropanol. The results of the measurements are reported in N/cm and are averaged from three measurements. All measurements were carried out at room temperature. In the same way the bond strength on polyethylene (PE) was measured.

Holding Power (Test G)

A strip of the adhesive tape, 13 mm wide, was applied to a smooth steel surface which had been cleaned three times with acetone and once with isopropanol. The area of application was 20 mm * 13 mm (length * width). Subsequently the adhesive tape was pressed onto the steel substrate 4 times using an applied pressure of 2 kg. At room temperature a 1 kg weight was fastened to the adhesive tape. The holding power, i.e. the time during which shearing is withstood, is reported in minutes and corresponds to the average of 3 measurements. The measurement is carried out under standard conditions (23° C., 50% humidity) and at 70° C. in a hot cabinet.

SAFT—Shear Adhesive Failure Temperature (Test H)

This test serves for accelerated testing of the shear strength of adhesive tapes under temperature load.

Preparation of samples for measurement: the adhesive-tape sample (PSA coated onto 50 μm PET film) is adhered to a ground steel test plate which has been cleaned with acetone, and is then overrolled six times at a speed of 10 m/min using a 2 kg steel roller.

The bond area of the sample, height×width, is 13 mm×10 mm; the sample is suspended vertically, protruding beyond the steel test plate by 2 mm at the top edge, and is reinforced flush with a stable adhesive strip which serves as a support for the travel sensor.

Measurement: The sample for measurement is loaded at the bottom end with a 50 g weight. The steel test plate with the adhered sample is heated, starting at 25° C. and at a rate of 9° C. per minute, to the final temperature of 200° C. Using the travel sensor, the slip travel of the sample is measured as a function of temperature and time. The maximum slip travel is set at 1000 μm; if it is exceeded, the test is discontinued. Testing conditions: room temperature 23±3° C., relative humidity 50±5%.

Positive Test Result:
Slip travel on reaching the end temperature (200° C.), reported in μm.

Negative Test Result:
Temperature on reaching maximum slip travel (1000 μm), reported in ° C.

Preparation of the Starting Polymers for Examples 1 to 4

The preparation of the starting polymers is described below. The polymers investigated were prepared conventionally via free-radical polymerization in solution.
HEMA=hydroxyethyl methacrylate
AIBN=2,2'-azobis(2-methylbutyronitrile)
Perkadox 16=bis(4-tert-butylcyclohexyl)peroxydicarbonate Polymer 1

A reactor conventional for free-radical polymerizations was charged with 56.25 kg of 2-ethylhexyl acrylate, 3.0 kg of acrylic acid, 0.75 kg of benzoin acrylate, 17 kg of special-boiling-point spirit 60/95, 17 kg of acetone and 6 kg of isopropanol. After nitrogen gas had been passed through the reactor for 45 minutes with stirring the reactor was heated to 58° C. and 30 g of AIBN were added. Subsequently the external heating bath was heated to 75° C. and the reaction was carried out constantly at this external temperature. After 1 h a further 30 g of AIBN were added and after 4 h the batch was diluted with 10 kg of acetone/isopropanol mixture (90:10). After 5 h and after 7 h, reinitiation was carried out with 90 g of Perkadox 16 on each occasion. After a reaction time of 22 h the polymerization was discontinued and the product cooled to room temperature. The polyacrylate has a K value of 50, a solids content of 54.6%, an average molecular weight of Mw=405 000, and a polydispersity (Mw/Mn)=8.2. After drying, the polymer was analyzed by test methods A, B and C.

Polymer 2

In the same way as for example 1, 26.25 kg of 2-ethylhexyl acrylate, 30.0 kg of n-butyl acrylate, 3.0 kg of HEMA, 0.75 kg of benzoin acrylate, 17 kg of special-boiling-point spirit 60/95, 17 kg of acetone and 6 kg of isopropanol were polymerized. Initiation was carried out twice with 30 kg of AIBN each time, twice with 90 g of Perkadox 16 each time, and dilution was carried out with 10 g of acetone/isopropanol mixture (90:10). After a reaction time of 22 h the polymerization was discontinued and the product was cooled to room temperature. The polyacrylate has a K value of 56, a solids content of 54.3%, an average molecular weight of Mw=412 000, and a polydispersity (Mw/Mn) of 7.8. After drying, the polymer was analyzed by test methods A, B and C.

Polymer 3

In the same way as for example 1, 28.65 kg of 2-ethylhexyl acrylate, 28.65 kg of n-butyl acrylate, 3.0 kg of acrylic acid, 0.6 kg of HEMA, 0.30 kg of benzoin acrylate, 15.5 kg of special-boiling-point spirit 60/95, 15.5 kg of acetone and 9 kg of isopropanol were polymerized.

Initiation was carried out twice with 30 g of AIBN each time, twice with 90 g of Perkadox 16 each time, and dilution was carried out with 10 kg of acetone/isopropanol mixture (85:15). After a reaction time of 22 h the polymerization was discontinued and the product was cooled to room temperature. The polyacrylate has a K value of 46, a solids content of 54.3%, an average molecular weight of Mw=305 000, and a polydispersity (Mw/Mn) of 6.8.

After drying, the polymer was analyzed by test methods A, B and C.

Polymer 4

In the same way as for example 1, 43.5 kg of 2-ethylhexyl acrylate, 12.0 kg of methyl acrylate, 3.0 kg of acrylic acid, 1.2 kg of HEMA, 0.3 kg of benzoin acrylate, 15.5 kg of special-boiling-point spirit 60/95, 15.5 kg of acetone and 9 kg of isopropanol were polymerized. Initiation was carried out twice with 30 g of AIBN each time, twice with 90 g of Perkadox 16 each time, and dilution was carried out with 10 kg of acetone/isopropanol mixture (85:15). After a reaction time of 22 h the polymerization was discontinued and the product was cooled to room temperature. The polyacrylate has a K value of 49, a solids content of 54.3%, an average molecular weight of Mw=330 000, and a polydispersity (Mw/Mn) of 6.9.

After drying, the polymer was analyzed by test methods A, B and C.

Polymer 5

A reactor conventional for free-radical polymerizations was charged with 43.5 kg of 2-ethylhexyl acrylate, 12.0 kg of methyl acrylate, 3.0 kg of acrylic acid, 1.2 kg of HEMA, 0.3 kg of benzoin acrylate, 80 g of benzyl dithiobenzoate and 40 kg of acetone. After nitrogen gas had been passed through the reactor for 45 minutes with stirring the reactor was heated to 58° C. and 30 g of AIBN were added. Subsequently the external heating bath was heated to 75° C. and the reaction was carried out constantly at this external temperature. After 1 h a further 30 g of AIBN were added. After 5 h and after 7 h, the addition took place of 90 g of Perkadox 16® (from Akzo) on each occasion. After a reaction time of 22 h the polymerization was discontinued and the product cooled to room temperature.

The polyacrylate has a K value of 42, a solids content of 60.2%, an average molecular weight of Mw=302 000, and a polydispersity (Mw/Mn)=2.6.

After drying, the polymer was analyzed by test methods A, B and C.

Concentration/Preparation of Hotmelt PSA (method 1):

The polymers 1-5 prepared by polymerization in solution were freed very substantially from solvent by means of a Berstorff single-screw extruder (concentration extruder). For this purpose the polymer solution was conveyed via a gear pump to the concentration extruder and was freed from the solvents by application of vacuum at the 3 domes. Shown by way of example here are the parameters for the concentration of polymer 1. The speed of the screw was 150 rpm, the motor current was 10 A, and a throughput of 65.3 kg liquid/h was realized. The underpressures were 580 mbar, 60 mbar and 9 mbar respectively, with the lowest vacuum being applied in the first dome. The excess temperature of the concentrated hotmelt was 90° C. The solids content after this concentration step was 99.5%.

Production of Inventive Adhesive Tapes, Blending with the Thermal Crosslinker, Coating and UV Crosslinking (Method 2, Examples 1 to 6)

The acrylate hotmelt PSAs freed from their solvents were melted in a feeder extruder (single-screw conveying extruder from Troester) and conveyed into a twin-screw extruder (from Leistritz, Germany, ref. LSM 30/34). The apparatus is electrically heated from the outside, is air-cooled by a number of fans, and is designed so that effective distribution of the crosslinking system in the polymer matrix is accompanied by the assurance of a short residence time of the adhesive in the extruder. For these purposes the mixing screws of the twin-screw extruder were arranged so that conveying elements are in alternation with mixing elements. The respective crosslinking systems (isocyanates, for example) are added using suitable metering equipment, at two or more sites where appropriate, and using metering aids where appropriate, into the unpressurized conveying zones of the twin-screw extruder.

After the ready-compounded adhesive, blended with crosslinker, has emerged from the twin-screw extruder, coating takes place directly, by means of a downstream SIG die, onto a PET film (from Mitsubishi) which is 23 µm thick and has been pretreated with Saran primer. The application rate in the case of all examples is 50 g/m². The coating was subsequently passed through a heating tunnel with two IR lamps. The temperature on the belt was 100° C. The belt speed was 20 m/min. UV curing was carried out using a UV unit from Eltosch. The unit is equipped with two medium-pressure Hg UV lamps, each having an intensity of 120 W/cm. The PSA tape specimens for crosslinking were run through the UV unit at 20 m/min. For the purpose of comparison, specimens without postcrosslinking by UV irradiation were evaluated (see table 2).

In the examples below, and in table 1, the operating conditions, metering proportions, and formulations are elucidated further.

Example 1

Polymer 1 was concentrated by method 1 (solids content 99.5%, viscosity test method D) and blended by method 2 with 0.30% by weight of the trimerized aliphatic diisocyanate Desmodur XP 2410 (from Bayer AG, Germany). To improve its meterability the trimerized diisocyanate was diluted in a ratio of 1:1 with the liquid phosphate ester Reofos 65 (from Great Lakes, USA). The operating parameters are summarized in table 1. The processing time of the compound was more than 30 minutes at an effective composition temperature of 82° C. after exiting the Leistritz extruder. Coating at a rate of 50 g/m² took place using an extrusion die from SIG onto pretreated PET film. The coating was subsequently heated by IR lamps and postcrosslinked by UV irradiation. After storage at 23° C. for 10 days, the technical adhesive properties were determined according to test methods E, F, G and H (table 2). In comparison with the non-UV-postcrosslinked reference specimen, the marked improvement in quality is apparent. The gel fraction rises and the crosslinking of the composition is much better. The holding power results and the SAFT test (test method H) are likewise distinctly improved. The adhesion as well is more favorable, since now the composition does not undergo cleavage.

Example 2

The base polymer 2 concentrated by method 1 (viscosity test method D) was subjected as in example 1 to blending with crosslinker and was coated, heated, and postcrosslinked. 0.40% by weight (based on acrylate copolymer) of the trimerized HDI polyisocyanate Desmodur N3600 (Bayer AG, Germany) was added, by method 2. After coating and UV irradiation as per method 2, and after storage for 10 days at room temperature, the specimen was analyzed by test methods E, F, G and H. For technical adhesive data see example 2 in table 2. The improvement in quality as a result of UV postcrosslinking is similar to that of example 1. The composition, however, is free of acrylic acid and is therefore somewhat softer. It is surprising that the bond of an acrylic-acid-free composition has sufficient thermal stability (SAFT test).

Example 3

Prior to concentration, 20% by weight of Foral 85 were dissolved in the solution of the polymer 2 and, following complete dissolution of the resin, concentration took place by method 1 (viscosity test method D). Subsequently, using method 2, 0.80% by weight (based on the acrylate copolymer) of Desmodur N3600 was mixed into the resin-modified acrylate hotmelt PSA, and coating and UV postcrosslinking took place as described in example 1. After storage at room temperature for 10 days the specimen was analyzed by test methods E, F, G and H. For technical adhesive data see example 3 in table 2. As the data suggest, resin-modified polyacrylates also exhibit very good values by this method.

Example 4

The base polymer 3 concentrated by method 1 (viscosity test method D) was subjected as in example 1 to blending with crosslinker and was coated, heated, and postcrosslinked. 0.40% by weight (based on acrylate copolymer) of Desmodur XP2410 (Bayer AG, Germany) was added, by method 2. After coating and UV irradiation as per method 2, and after storage for 10 days at room temperature, the specimen was analyzed by test methods E, F, G and H. For technical adhesive data see example 4 in table 2.

Example 5

The base polymer 4 concentrated by method 1 (viscosity test method D) was subjected as in example 1 to blending with crosslinker and was coated, heated, and postcrosslinked. 0.40% by weight (based on acrylate copolymer) of Desmodur XP2410 (Bayer AG, Germany) was added, by method 2. After coating and UV irradiation as per method 2, and after storage for 10 days at room temperature, the specimen was analyzed by test methods E, F, G and H. For technical adhesive data see example 5 in table 2. This polyacrylate has a particularly high shear strength.

Example 6

The base polymer 5 concentrated by method 1 (viscosity test method D) was subjected as in example 1 to blending with crosslinker and was coated, heated, and postcrosslinked. 0.50% by weight (based on acrylate copolymer) of Desmodur XP2410 (Bayer AG, Germany) was added, by method 2. After coating and UV irradiation as per method 2, and after storage for 10 days at room temperature, the specimen was analyzed by test methods E, F, G and H. For technical adhesive data see example 6 in table 2. Even with a narrow molecular weight distribution it is possible by this method to obtain high-performance acrylate PSAs.

For all examples, molecular weights of below 500 000 g/mol were found (test C). In this way, good hotmelt processing properties are ensured. A further factor decisive for coating as a hotmelt is that of dynamic flow viscosity. For comparison purposes, therefore, the flow viscosity of all of the examples was determined using the rheometer (test D). The results are set out in table 2. The flow viscosities measured are situated at a low level and indicate that the acrylate hotmelt PSAs are readily processable from the melt.

Entirely surprising for the skilled worker are the excellent coating properties of the hotmelt adhesive following the addition and mixed incorporation of the thermal crosslinking system into the polyacrylate adhesive at the temperatures of between 60 and 100° C. that prevail in the compounding equipment, preferably between 70° C. and 80° C. Coating properties in this context refer to the suitability for shaping the crosslinker-blended adhesive into thin layers and for its application to a web-form backing material by means of a coating die or roll-coating apparatus. The expectation was that there would be crosslinking or geling of the adhesive, with the consequence that subsequent coating would no longer have been possible. In actual fact, however, the adhesives described can be used for coating within a certain period of time following the addition of crosslinker and compounding. The processing time is heavily dependent on the molecular weight and the functionalization of the polyacrylate adhesive, and also on the type and amount of the crosslinking system used and the prevailing operating conditions, such as the composition temperature and the geometry of the compounding equipment, for example.

By virtue of this dual crosslinking it is possible to utilize the advantage of good coating properties and high anchorage capacity to backing materials of a composition having a low weight-average molecular weight, and to overcome the anticipated disadvantage of the significantly restricted technical adhesive properties of such compositions. As is apparent from the data in table 2, it is possible by this method—the dual crosslinking mechanism: thermal crosslinking of an acrylate hotmelt PSA, followed by radiationchemical postcrosslinking, preferably UV crosslinking—to prepare very high-performance adhesives. The adhesion values are very good, particularly in the case of resin-modified compositions. A particular surprise, however, is the cohesion, as measured by the holding powers at 23° C. and 70° C. Surprisingly good to the skilled worker is the thermal stability, as measured by the SAFT test. In each case, the adhesive bond is stable up to a temperature of 200° C. This was not to have been expected with polyacrylates which exhibit a low average molecular weight. The low average molecular weight allows good processing capacity in the extrusion operation. The melt viscosity and the processing temperature are relatively low, which facilitates the incorporation of thermal crosslinkers into the melt—although this was not to have been expected. Only as a result of the subsequent UV crosslinking, however, is a significant improvement obtained in the quality of the technical adhesive properties.

TABLE 1

The principal parameters for incorporating the crosslinker into the ACA hotmelt PSA by method 2, specimen production Crosslinker incorporation, coating, postcrosslinking by method 2 (50 g/m² adhesive on 23 μm pretreated PET film, 2 IR lamps (100° C. on the belt, 20 m/min), 2 UV lamps (medium-pressure Hg, each 120 W/cm, 20 m/min))

| Example | Base polymer Polymer | Base polymer K value (Test B) | Tackifier resin Fraction [wt. %] | Melt viscosity of the adhesive at 10 rad/s and 100° C. η [Pa s] (Test D) | Crosslinker [% based on polymer] | Adhesive throughput TSE [kg/h] | Rotational speed TSE [1/min] |
|---|---|---|---|---|---|---|---|
| B 1 | P 1 | 50 | — | 217 | 0.30% Desmodur XP2410 | 15.0 | 50 |
| B 2 | P 2 | 56 | — | 280 | 0.40% Desmodur N3600 | 13.0 | 50 |
| B 3 | P 2 | 56 | 20% Foral 85 | 183 | 0.80% Desmodur N3600 | 14.5 | 100 |
| B 4 | P 3 | 46 | — | 167 | 0.40% Desmodur XP2410 | 12.4 | 50 |

TABLE 1-continued

The principal parameters for incorporating the crosslinker
into the ACA hotmelt PSA by method 2, specimen production

| | | | | | | | |
|---|---|---|---|---|---|---|---|
| B 4 | P 4 | 49 | — | 187 | 0.40% Desmodur XP2410 | 12.5 | 50 |
| B 6 | P 5 | 42 | — | 120 | 0.50% Desmodur XP2410 | 12.0 | 70 |

Crosslinker incorporation, coating, postcrosslinking by method 2
(50 g/m² adhesive on 23 μm pretreated PET film, 2 IR
lamps (100° C. on the belt, 20 m/min),
2 UV lamps (medium-pressure Hg, each 120 W/cm, 20 m/min))

| Example | Setpoint temperature TSE [° C.] | Current consumption TSE [A] | Exit pressure TSE [bar] | Adhesive temperature after TSE [° C.] | Temperature of coating die [° C.] | Gel-free time* [min] |
|---|---|---|---|---|---|---|
| B 1 | 70 | 9.7 | 9.2 | 82 | 80 | 25 |
| B 2 | 70 | 11.2 | 9.9 | 85 | 80 | >30 |
| B 3 | 60 | 9.7 | 8.8 | 73 | 70 | >30 |
| B 4 | 70 | 12.5 | 10.2 | 76 | 80 | >30 |
| B 4 | 70 | 13.1 | 11.5 | 79 | 80 | 20 |
| B 6 | 60 | 10.2 | 9.3 | 68 | 70 | 30 |

TSE = twin-screw extruder;
*Processing time

TABLE 2

The principal technical adhesive properties of examples 1-6
Specimens in each case 50 g/m² adhesive on 23 μm PET film

| Example | Composition | | | UV irradiation (Method 2) | Gel value [%, based on polymer] (Test E) | Bond strength to steel [N/cm] (Test F) | Bond strength to PE [N/cm] (Test F) | Holding power 10 N 23° C. [min] (Test G) | Holding power 10 N 70° C. [min] (Test G) | SAFT Test (Test H) |
|---|---|---|---|---|---|---|---|---|---|---|
| B 1 without UV | P 1 | — | 0.30% Desmodur XP2410 | without | 24 | 7.2 (C) | 2.7 (C) | 120 (C) | 5 (C) | 1000 μm (120° C.) |
| B 1 | P 1 | — | 0.30% Desmodur XP2410 | 2 × 120 W/cm | 75 | 5.4 | 1.2 | >10000 | 55 | 257 μm (200° C.) |
| B 2 without UV | P 2 | — | 0.40% Desmodur N3600 | without | 33 | 8.8 (C) | 4.2 (C) | 62 (C) | 2 (C) | 1000 μm (97° C.) |
| B 2 | P 2 | — | 0.40% Desmodur N3600 | 2 × 120 W/cm | 77 | 3.6 | 1.8 | 1547 | 27 | 670 μm (200° C.) |
| B 3 | P 2 | 20% Foral 85 | 0.80% Desmodur N3600 | 2 × 120 W/cm | 72 | 4.9 | 2.8 | 1849 | 17 | 850 μm (200° C.) |
| B 4 | P 3 | — | 0.40% Desmodur XP2410 | 2 × 120 W/cm | 65 | 5.5 | 1.9 | 3572 | 20 | 425 μm (200° C.) |
| B 5 | P 4 | — | 0.40% Desmodur XP2410 | 2 × 120 W/cm | 68 | 4.3 | 1.2 | >10000 | 556 | 130 μm (200° C.) |
| B 6 | P 5 | — | 0.50% Desmodur XP2410 | 2 × 120 W/cm | 72 | 4.8 | 1.0 | >10000 | 1245 | 80 μm (200° C.) |

The tests were carried out after storage at 23° C. and 50% humidity for 10 days.
C = cohesive fracture, adhesive undergoes cleavage

We claim:

1. A process for preparing a polyacrylate-based shaped article, said process comprising the following steps:
   a) forming a polyacrylate by copolymerizing comonomers having thermally crosslinkable groups and comonomers having attached photoinitiators,
   b) thermally crosslinking the polyacrylate formed, and subsequently
   c) crosslinking the polyacrylate by irradiation with UV light.

2. The process as claimed in claim 1, wherein the shaped article is of two-dimensionally flat extent.

3. The process as claimed in claim 1, wherein the polyacrylate is a polyacrylate pressure-sensitive adhesive.

4. The process as claimed in claim 3, wherein following polymerization the polyacrylate pressure-sensitive adhesive is coated from the melt onto a permanent or temporary backing and the crosslinking steps take place after the coating operation.

5. The process as claimed in claim 3, wherein the polyacrylate pressure-sensitive adhesive prior to the crosslinking steps has a weight-average molecular weight of not more than 500 000 g/mol.

6. The process as claimed in claim 4, wherein the polyacrylate pressure-sensitive adhesive in the melt has a residual solvent fraction of not more than 1%.

7. The process as claimed in claim 2, wherein the polyacrylate is a polyacrylate pressure-sensitive adhesive.

8. The process as claimed in claim 7, wherein following polymerization the polyacrylate pressure-sensitive adhesive is coated from the melt onto a permanent or temporary backing and the crosslinking steps take place after the coating operation.

9. The process as claimed in claim 7, wherein the polyacrylate pressure-sensitive adhesive prior to the crosslinking steps has a weight-average molecular weight of not more than 500 000 g/mol.

10. The process as claimed in claim 8, wherein the polyacrylate pressure-sensitive adhesive in the melt has a residual solvent fraction of not more than 1%.

\* \* \* \* \*